(12) United States Patent
Kolze

(10) Patent No.: US 7,184,506 B2
(45) Date of Patent: Feb. 27, 2007

(54) FREQUENCY DRIFT AND PHASE ERROR COMPENSATION IN A VOFDM RECEIVER

(75) Inventor: Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 702 days.

(21) Appl. No.: 10/112,128

(22) Filed: Mar. 30, 2002

(65) Prior Publication Data
US 2003/0185326 A1    Oct. 2, 2003

(51) Int. Cl.
*H04L 7/00* (2006.01)

(52) U.S. Cl. ............. 375/371; 375/362; 375/375; 375/226

(58) Field of Classification Search ......... 375/371, 375/362, 375, 226; 370/516
See application file for complete search history.

(56) References Cited

U.S. PATENT DOCUMENTS

| | | | |
|---|---|---|---|
| 5,121,414 A | | 6/1992 | Levine et al. |
| 5,260,975 A | * | 11/1993 | Saito ............. 375/327 |
| 5,376,894 A | * | 12/1994 | Petranovich ......... 329/306 |
| 5,594,758 A | * | 1/1997 | Petranovich ......... 375/344 |
| 5,898,665 A | * | 4/1999 | Sawahashi et al. ...... 370/342 |
| 5,987,063 A | * | 11/1999 | Rinne ............. 375/226 |
| 6,650,719 B1 | * | 11/2003 | Baker ............. 375/371 |
| 6,839,381 B1 | * | 1/2005 | Sheng et al. ......... 375/150 |

FOREIGN PATENT DOCUMENTS

EP    1 241 846 A2    3/2002

WO    WO 00/79751 A1    12/2000

OTHER PUBLICATIONS

Ayanoglu "Broadband Wireless Internet Forum presentation" Jun. 25, 2001 WCAI, pp. 1-15.*
Ayanoglu, "Broadband Wireless Internet Forum white paper:VOFDM Broadband Wireless Transmission and its Advantages over single Carrier Modulation", BWIF Dec. 12, 2000, pp. 1-35.*
Ye (Geoffrey) Li, Justin C. Chuang, Nelson R. Sollenberger, "Transmitter Diversity for OFDM Systems and Its Impact on High-Rate Data Wireless Networks," IEEE Journal on Selected Areas in Communications, vol. 17, No. 7, Jul. 1999, pp. 1233-1243.

* cited by examiner

*Primary Examiner*—Temesghen Ghebretinsae
*Assistant Examiner*—Juan Alberto Torres
(74) *Attorney, Agent, or Firm*—Garlick Harrison & Markison; Shayne X. Short

(57) ABSTRACT

Improved frequency drift and phase error compensation in a VOFDM receiver. The invention is operable to compensate for frequency drift and phase error within a window that may include a single frame, a sub-frame, or multiple frames. The compensation is performed after having performed estimation of the phase within the particular window; any phase error and frequency drift may be identified and an appropriate form of compensation may be identified to perform curve fitting of the phase within the compensation window. The curve fitting of the phase is performed using linear techniques in one embodiment; an average phase and appropriate slope/ramp are calculated to match the phase as accurately as possible. Other alternative compensation techniques may also be performed, including higher order curve matching techniques. The receiver is operable to perform any necessary compensation before passing the now-compensated data to a symbol processing functional block.

56 Claims, 13 Drawing Sheets

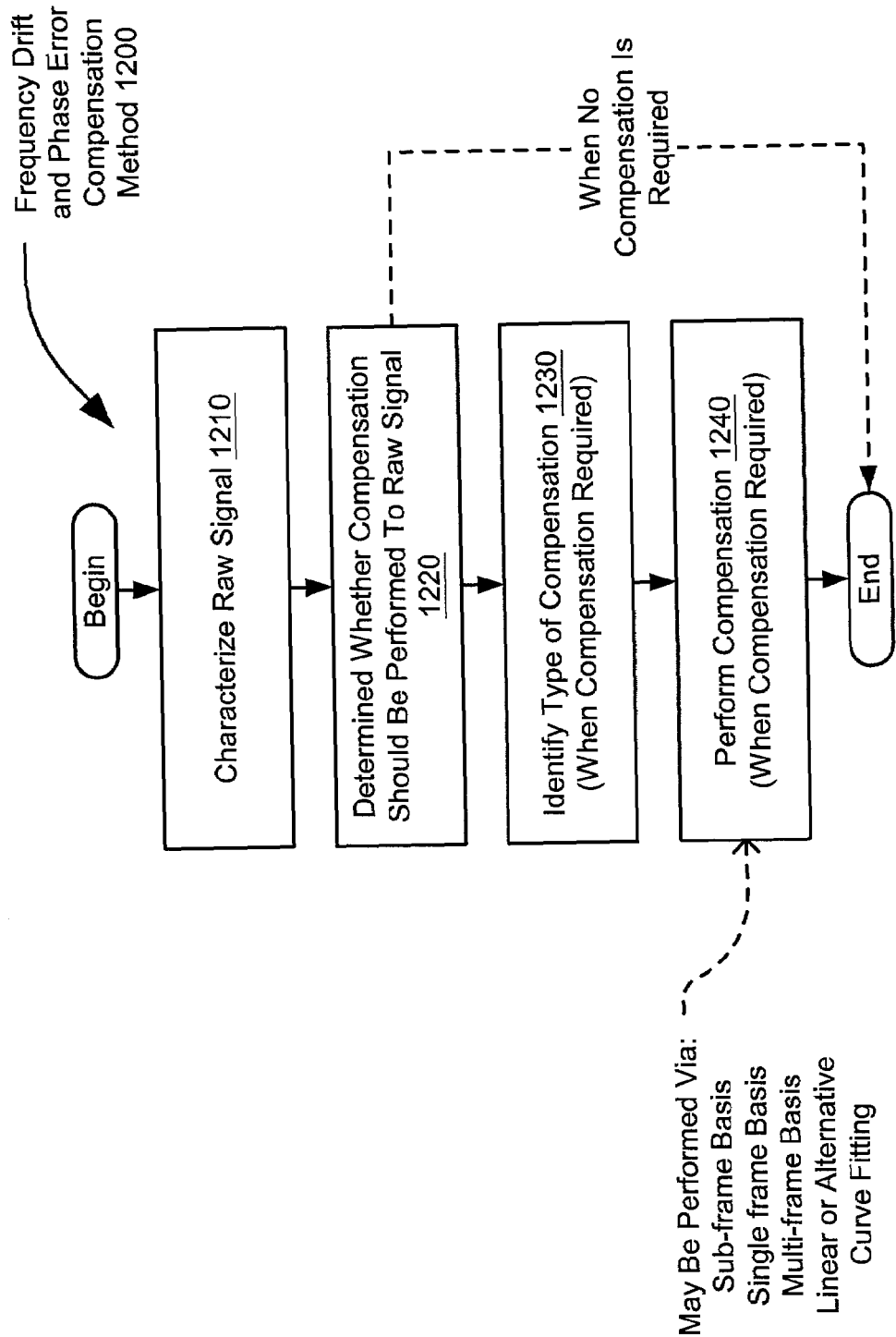

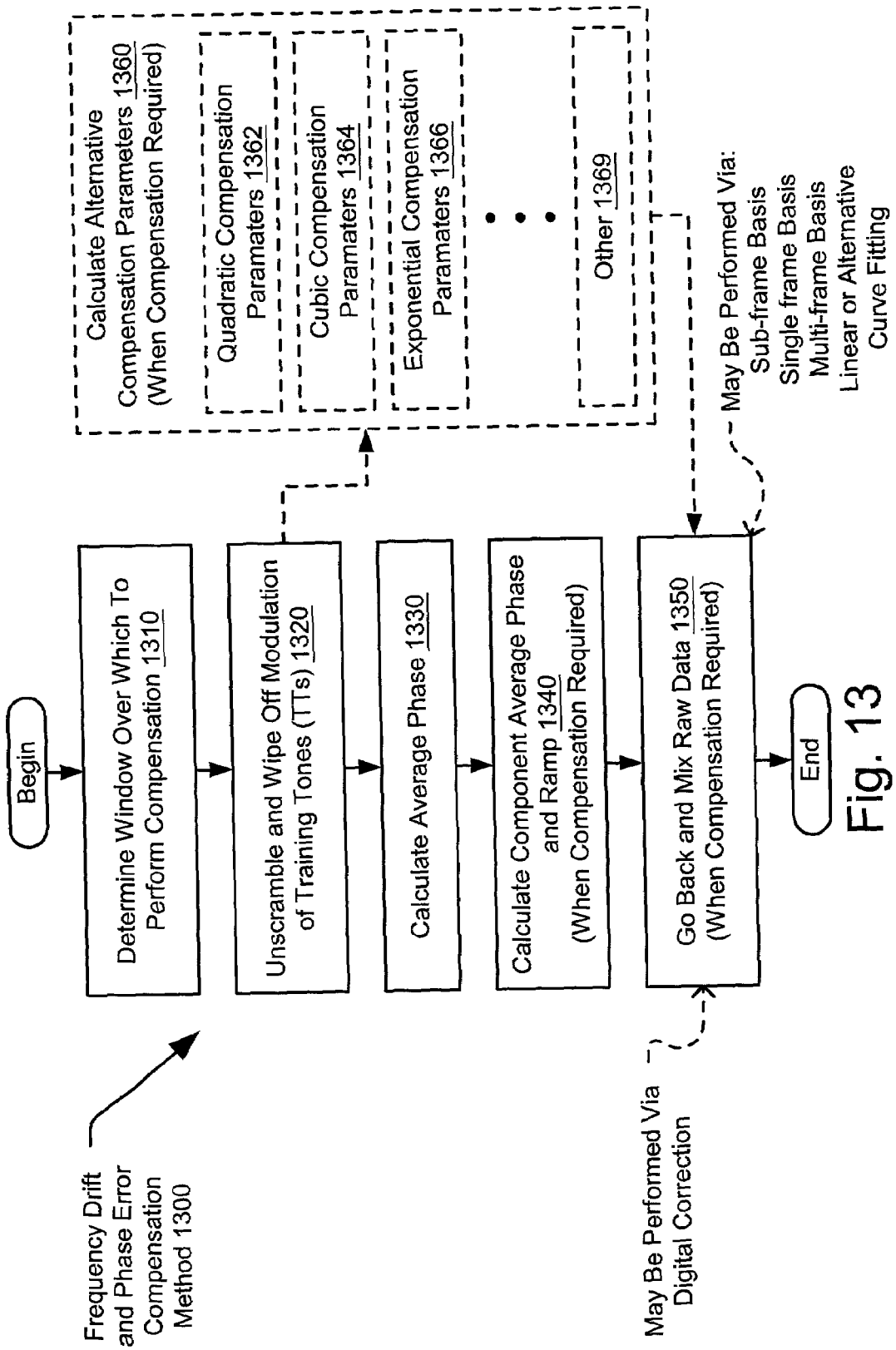

FREQUENCY DRIFT AND PHASE ERROR COMPENSATION IN A VOFDM RECEIVER

CROSS REFERENCE TO RELATED APPLICATIONS

The following U.S. Utility Patent Applications are hereby incorporated herein by reference in their entirety and made part of the present U.S. patent application for all purposes:

1. U.S. Utility patent application Ser. No. 10/109,978, entitled "OPTIMAL DECISION METRIC APPROXIMATION IN BIT-SOFT DECISIONS," filed Saturday, Mar. 30, 2002, pending.

2. U.S. Utility patent application Ser. No. 10/112,009, entitled "MODIFIED BRANCH METRICS FOR PROCESSING SOFT DECISIONS TO ACCOUNT FOR PHASE NOISE IMPACT ON CLUSTER VARIANCE," filed Saturday, Mar. 30, 2002, pending.

3. U.S. Utility patent application Ser. No. 10/112,567, entitled "CHARACTERIZING CHANNEL RESPONSE IN A SINGLE UPSTREAM BURST USING REDUNDANT INFORMATION FROM TRAINING TONES." filed Saturday, Mar. 30, 2002, pending.

4. U.S. Utility patent application Ser. No. 10/114,023, entitled "VOFDM RECEIVER CORRELATION MATRIX PROCESSING USING FACTORIZATION," filed Mar. 30, 2002, now U.S. Pat. No. 6,947,715, issued on Sep. 20, 2005.

BACKGROUND

1. Technical Field

The invention relates generally to communication systems; and, more particularly, it relates to communication systems that seek to perform frequency drift and phase error compensation in receivers that employing vector orthogonal frequency division multiplexing (VOFDM).

2. Related Art

Communication systems transmit digital data through imperfect communication channels. These symbols may undergo some undesirable corruption due to the imperfection of the communication channel. One effort to try to avoid such situations is focused on performing forward error correction (FEC) coding. However, there is typically some difficulty in extracting the information contained within these symbols after they have been undesirably altered within the communication channel. There exist some methods that seek to curb the effect that the communication channel has had on the data; one such method includes employing using Decision Feedback Equalizers (DFEs). However, even after the incoming signal has been equalized, the extraction of the data, that has undergone some alteration due to the channel effects, is still a probabilistic determination.

To further complicate the issue, the source signal that provides the data that are received by a receiver within the communication system may sometimes undergo undesirable frequency drift. The effect can be phase error and/or frequency drift in the received data, thereby making the extraction of the data even that much more difficult at the receiver end. Typically, data are transmitted using bursts (a number of symbols) that have a frequency and phase error. Prior art receiver systems typically assume that any phase error is fixed during a received frame of data. However, frequency drift and phase error may actually exist within the very frame that is being demodulated and decoded.

One prior art approach is to simply calculate an average phase for the given frame. For example, in a prior art receiver, the incoming signal is phase compensated (in a frequency tracking operation) to translate each received frame according to the average error determined during the frame. In the prior art receiver, the average frequency and phase error is determined based upon prior frames and applied to the current received frame. The deficiency of the prior art method is clear; if there is frequency drift and phase error within the current frame, then this prior art form of compensation will not sufficiently compensate for error within the current frame. As is typically the case, the frequency and phase error is not fixed during the frame; moreover, it is not most-accurately predicted based upon prior frames.

While the average phase error is estimated for the current block with the benefit of the current block, the frequency error on the other hand (which causes a ramp of phase error across the frame), is only being estimated using past frames, and does not benefit from observation of the current frame. Thus, the prior art receiver suffers in its operation due to erroneous frequency and phase compensation, causing errors in data demodulation and subsequent decoding.

Further limitations and disadvantages of conventional and traditional systems will become apparent to one of skill in the art through comparison of such systems with the invention as set forth in the remainder of the present application with reference to the drawings.

SUMMARY OF THE INVENTION

Various aspects of the invention can be found in a receiver that is operable to perform signal processing of a received signal that has been encoded and modulated using VOFDM. The present invention provides for improved frequency drift and phase error compensation prior to demodulating and decoding the received signal. Initially, a received signal is analyzed to determine whether any phase error or frequency drift exists in a particular sample window of analysis. Then, the present invention determines the appropriate compensation that should be performed to accommodate any existent phase error and/or frequency drift. The approach to perform this may take various forms. For example, one form involves performing linear curve matching techniques that involves calculating an average phase for the frame, a ramp, and maintaining zero mean compensation. It is noted that the compensation may be performed using any number of variations. The window within which the compensation may be performed may be a sub-frame, a single frame, and/or a number of frames (multi-frame); moreover, the window may include a combination of one or more sub-frames and frames. This compensation may be implemented via linear curve fitting and/or alternative curve fitting including higher order curve fitting.

The compensation may be understood as follows: one copy of the received signal is provided for performing estimation on the received signal (to detect any phase error or frequency drift); another copy of the received signal is actually modified to perform the compensation. From this perspective, any frequency drift and phase error is characterized for a current window of frame and the characterization is applied to a delayed copy of that window to provide for improved frequency drift and phase error compensation over that particular window. It is also understood that the very same signal may be used to perform both the estimation of the signal, and that same signal may be modified thereby executing any compensation that may be needed.

Any number of techniques may be employed to perform the estimation/characterization of the window of data. There may be situations where no compensation need be performed; in such cases, the data simply bypasses the compensation functional blocks and is then provided to subsequent processing functional blocks that may include symbol processing.

The present invention is implemented within a wireless modem receiver in one embodiment; this communication system employs the VOFDM portion of the Broadband Wireless Internet Forum (BWIF) standard set. It is also noted that the present invention would benefit any multi-tone modulation scheme. The phase error and frequency drift compensation may be performed prior to performing the symbol processing of data within a given compensation window. The present invention helps ensure a higher probability that the data are demodulated and decoded properly.

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

FIG. 12 is a functional block diagram illustrating an embodiment of a frequency drift and phase error compensation method that is performed according to the present invention.

FIG. 13 is a functional block diagram illustrating another embodiment of a frequency drift and phase error compensation method that is performed according to the present invention.

DETAILED DESCRIPTION OF THE INVENTION

The present invention is operable to determine whether there is any phase error and/or frequency shift in an incoming signal, and to compensate for any of those errors before providing the received signal to subsequent signal processing circuitry for symbol processing. There are a variety of means by which the phase error and frequency drift estimation and compensation may be performed without departing from the scope and spirit of the invention, and any method may be employed to determine the existence of these effects before compensating for them when deemed necessary. The present invention is operable within a receiver circuitry; the receiver circuitry includes a wireless modem in certain embodiments.

The present invention is operable within the VOFDM portion of the BWIF standard set. The VOFDM standard defines the physical layer and additional layers in which a plurality, e.g., up to 1,024 separate carriers (tones) carry data (data tones), null information (zero tones), and training signals (training tones). The 1,024 tones are separated in frequency such that they are orthogonal to one another as understood within orthogonal frequency division multiplexing (OFDM). The "vector" portion of the VOFDM standard is defined in terms of a multiple antenna receive path that combines the signals received via each of the antennae in the multi-antenna array.

The VOFDM signal processing operations, due to the spacing of the pilot tones and the data tones, may be (unfortunately) subject to significant phase noise. This degradation due to phase noise is primarily caused by the interaction of the various orthogonal data tones and pilot tones. Phase noise may be introduced by inadequacies in the sampling portions of the receiver, including phase noise inherent in the generation of the LO (local oscillator) that is used for down-converting from the higher transmission frequency. Similarly, phase noise may be introduced due to imperfections at the transmitter end of the communication channel as well. In higher order modulation types such as QPSK, 16 QAM, 64 QAM, 256 QAM, and 1024 QAM, this phase noise has a large impact on the mapping of symbols into the constellations. Such is the case because phase noise causes outer-constellation points to have a greater variance than inner-constellation points for an equal phase noise contribution. Typically, for a 16 QAM implementation, outer constellation points will suffer nine times as large a variance (three times standard deviation) for a same amount of phase noise as compared to inner constellation points. Bit soft decisions are significantly affected by this phase noise.

Figure 1:
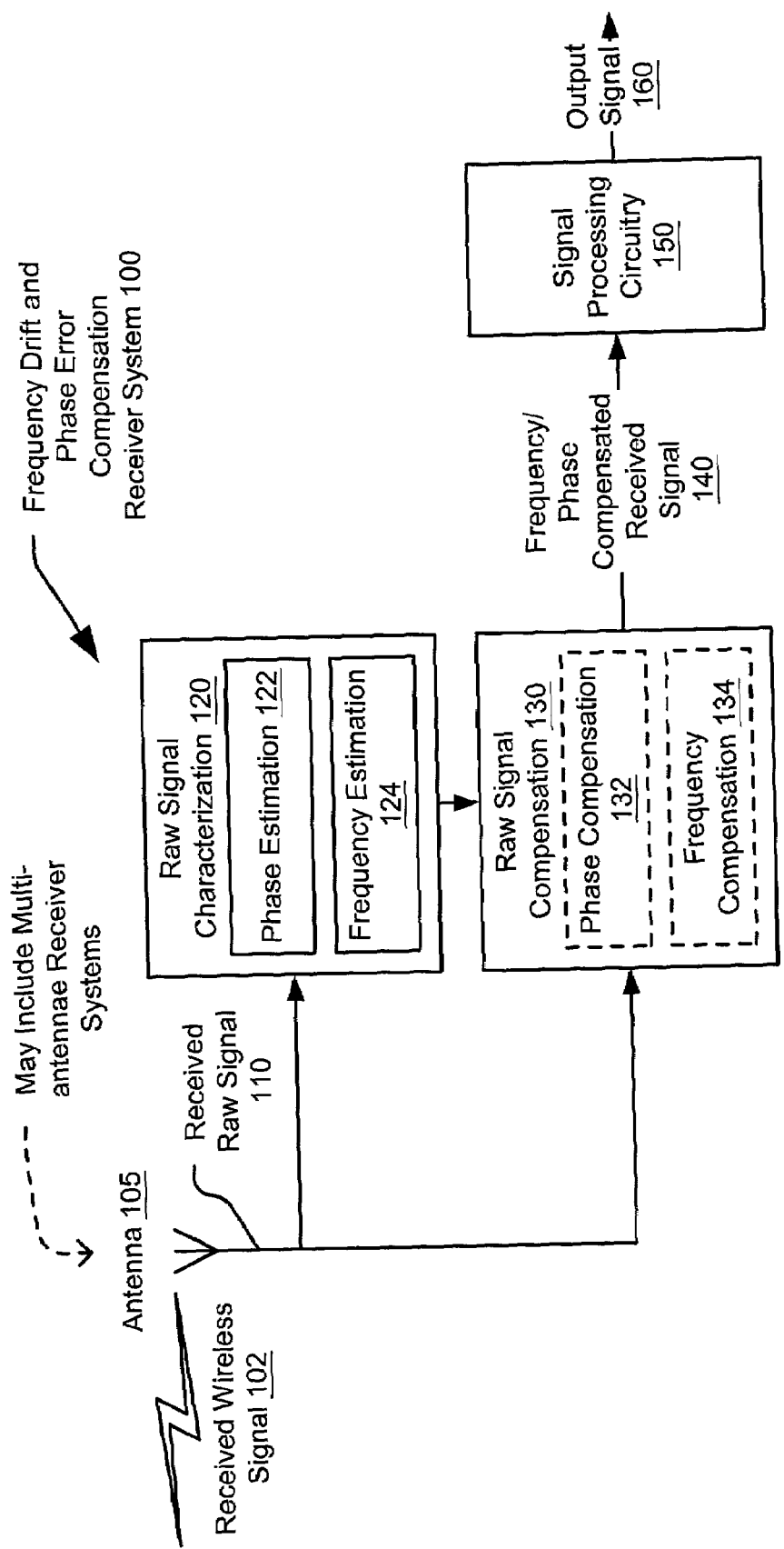
FIG. 1 is a system diagram illustrating an embodiment of a frequency drift and phase error compensation receiver system that is built according to the present invention.

FIG. 1 is a system diagram illustrating an embodiment of a frequency drift and phase error compensation receiver system 100 that is built according to the present invention. An antenna 105 receives a received wireless signal 102. It is noted, in addition, that the present invention is operable on received signals that are not wireless in nature; any received signal that may have been undesirably corrupted in a communication channel may benefit from the present invention. The antenna 105 provides a received raw signal 110 to two functional blocks: raw signal characterization 120 and raw signal compensation 130. These functional blocks may be implemented in a single device, or in separate devices. In one embodiment, both of these functional blocks 120 and 130 are included within a wireless modem receiver circuitry. The raw signal characteristic 120 performs phase estimation 122 and frequency estimation 124 in order to detect any phase error and any frequency drift in the received raw signal 110. When there is in fact either one of phase error or frequency drift in the received raw signal 110, then the raw signal characterization 120 signals to the raw signal compensation 130 to perform the appropriate compensation on the received raw signal 110, as shown by one or both of the functional blocks: phase compensation 132 and frequency compensation 134. When the received raw signal 110 must undergo some compensation, as determined by the raw signal characterization 120 functional block, then the appropriate and identified compensation operations are performed by the phase compensation 132 and frequency compensation 134 functional blocks. The raw signal compensation 130 functional block then generates and outputs a frequency/phase compensated received signal 140 to signal processing circuitry 150; the signal processing circuitry then generates the output signal 160 of the frequency drift and phase error compensation receiver system 100.

However, there are times when no phase or frequency compensation needs to be performed; for example, when the raw signal characteristic 120 functional block determines that there is no phase error and any frequency drift in the received raw signal 110. In these situations, compensation operations of the phase compensation 132 and frequency compensation 134 functional blocks are not employed; the received raw signal 110 itself is simply passed out through the raw signal compensation 130 functional block as the frequency/phase compensated received signal 140. It is then, in effect, the received raw signal 110 that is passed straight through to the signal processing circuitry 150. The signal processing circuitry 150 may be viewed, from certain perspectives, as any receiver signal processing that may be performed on a received signal. The raw signal characterization 120 and raw signal compensation 130 functional blocks ensure that the signal processing circuitry 150 always receives an input signal having substantially no phase error and/or frequency drift.

Figure 2:
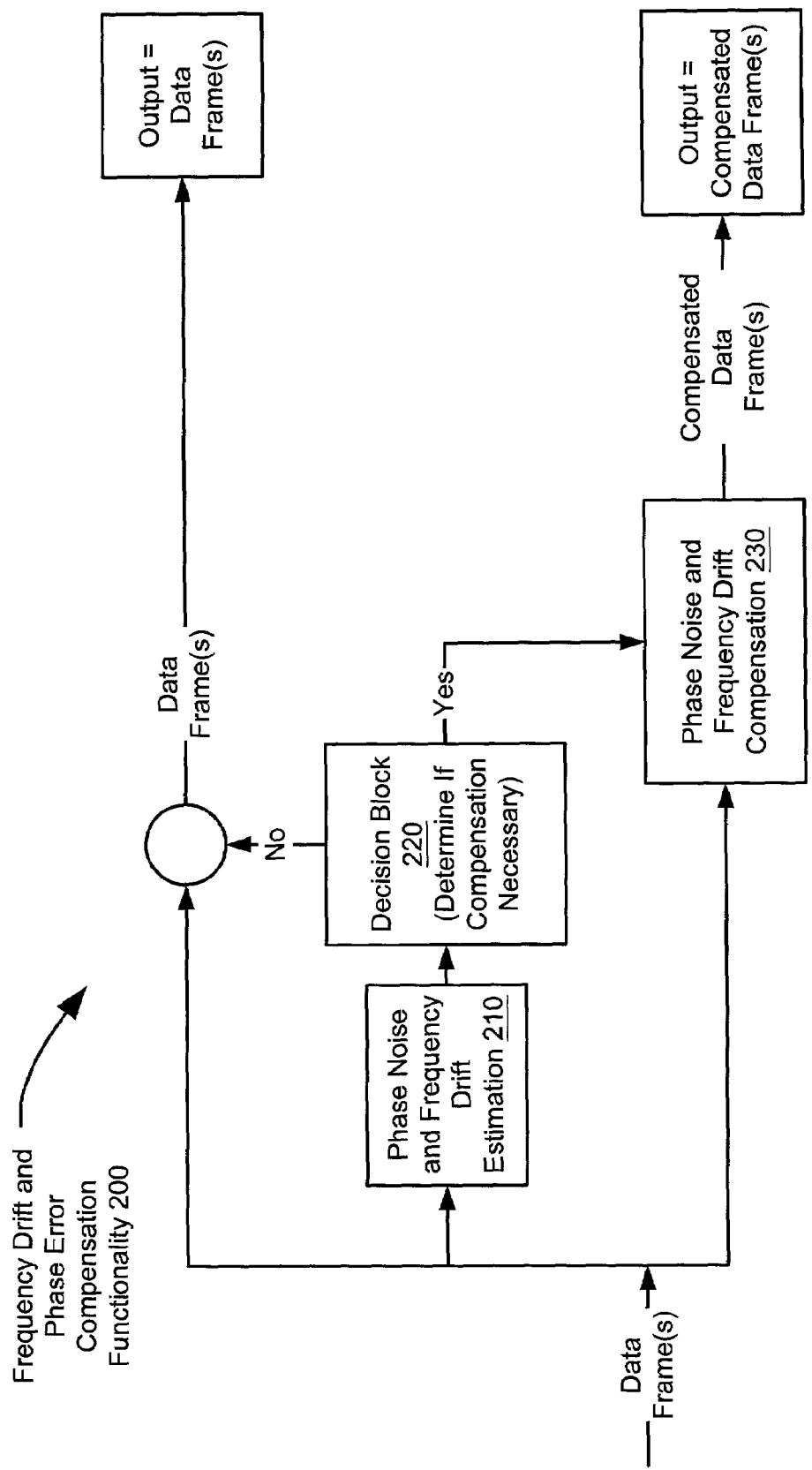
FIG. 2 is a system diagram illustrating an embodiment of frequency drift and phase error compensation functionality that is performed according to the present invention.

FIG. 2 is a system diagram illustrating an embodiment of frequency drift and phase error compensation functionality 200 that is performed according to the present invention. One or more data frames are simultaneously provided to two functional blocks: phase noise and frequency drift estimation 210 and phase noise and frequency drift compensation 230. The phase noise and frequency drift estimation 210 functional block determines whether there is any phase error and/or frequency drift in the received one or more data frame(s). After performing this estimation, then the phase noise and frequency drift estimation 210 functional block communicates this information to a decision block 220 where it is determined whether any compensation should be performed to compensate for any phase error and/or frequency drift in the data frames. The decision block 220 may employ one or more thresholds to determine whether any corruption in the received one or more data frames is such that compensation would be beneficial. If it is determined that no compensation is in fact necessary, then the decision block 220 will indicate to the phase noise and frequency drift estimation 210 functional block that the one or more data frames are simply passed as the output within the frequency drift and phase error compensation functionality 200.

However, if the decision block 220 does find that compensation should be performed, then it indicates this information to the phase noise and frequency drift compensation 230 functional block, that has already received the one or more data frames. After performing the appropriate and identified compensation operations within the phase noise and frequency drift compensation 230 functional block, the now-modified one or more data frames are passed as the output of the frequency drift and phase error compensation functionality 200, namely, as one or more compensated data frames.

Figure 3:
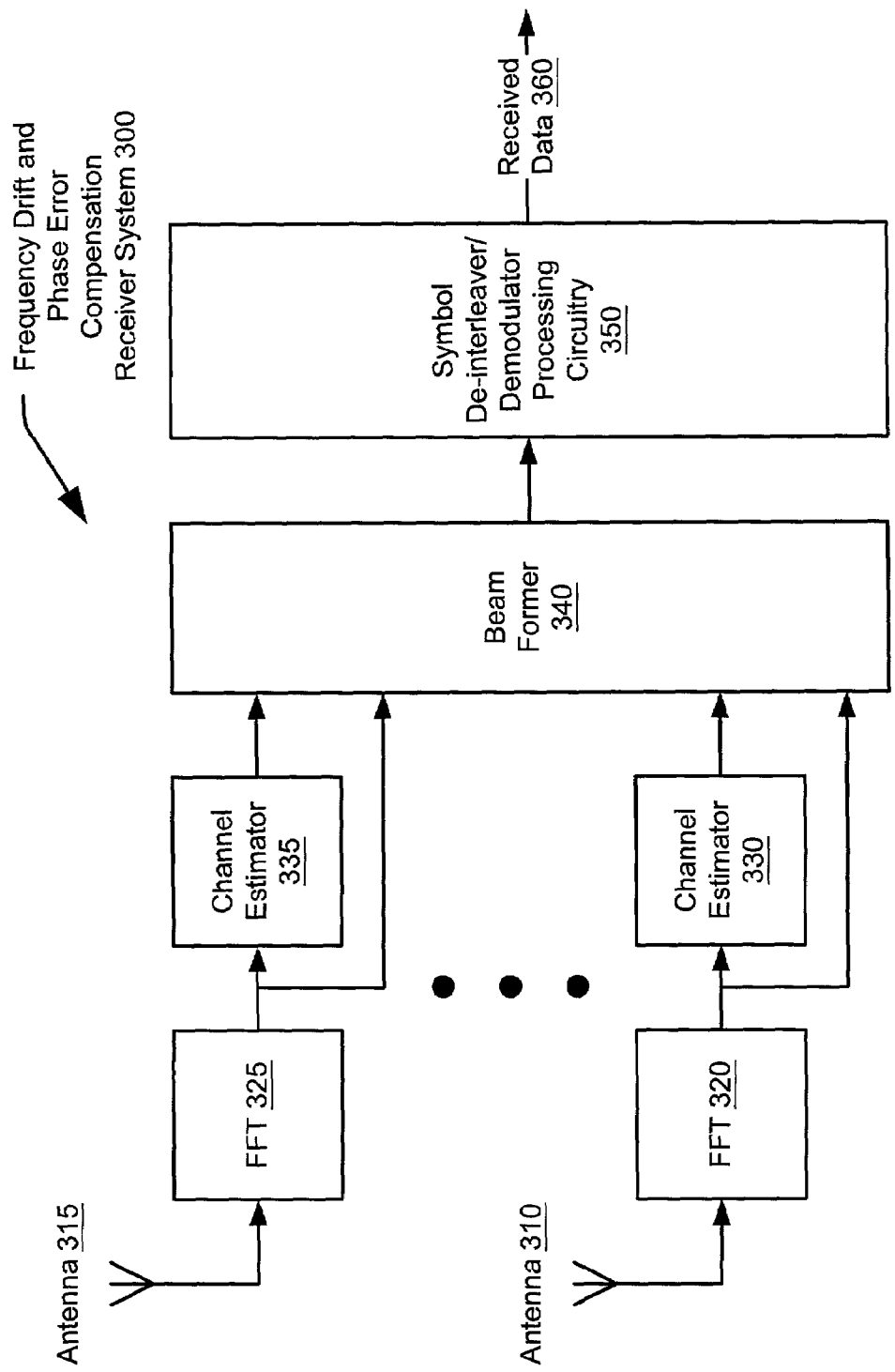
FIG. 3 is a system diagram illustrating another embodiment of a frequency drift and phase error compensation receiver system that is built according to the present invention.

FIG. 3 is a system diagram illustrating another embodiment of a frequency drift and phase error compensation receiver system 300 that is built according to the present invention. The embodiment shown in the FIG. 3 is operable using a multi-antennae array, including an antenna 315, . . . , and an antenna 310. After the antenna 315 receives a wireless communication signal, then a fast Fourier transform (FFT) is performed as shown in a block 325. The results of the FFT 325 are simultaneously passed to a channel estimator 335 and to a beam former 340. Similarly, any other antennae within the multi-antennae array that receive a signal also have a signal path that is fed to an FFT, whose output is also fed to a channel estimator and also to the beam former 340. The last antenna in the array, antenna 310, also receives a wireless communication signal; a FFT is performed on that received signal as shown in a block 320. The results of the FFT 320 are simultaneously passed to a channel estimator 330 and to the beam former 340.

The beam former 340 takes all of these above-described inputs to perform optimal channel combining. As will be described in further detail below, the present invention is operable to achieve spatial diversity by employing multiple antennae; this technique uses a VOFDM portion of the BWIF standard set. The operations involved in receive beamforming and VOFDM receive diversity signal reception are actually similar in operation. The receive processing, as performed by the beam former 340, initiates by receiving signals via multiple antennae, as shown by antenna 315, . . . , and antenna 305. The received signals of the multi-antenna array, are correlated with a known signal structure. This signal structure may be a spectral spreading sequence, a training sequence, or training tones. The output of this correlation yields a channel response matrix. The signal power, signal quality, channel magnitude and channel phase are estimated for each receive channel. Those channel quality estimates are used for optimal channel combining. Then, the beam former generates this output for input to symbol de-interleaver/demodulator processing circuitry 350; the functional block 350 then outputs the received data 360. The received data 360 may be viewed as being the best estimate of the data that were originally transmitted to the antenna 315, . . . , and antenna 310 from some transmitter device.

Figure 4:
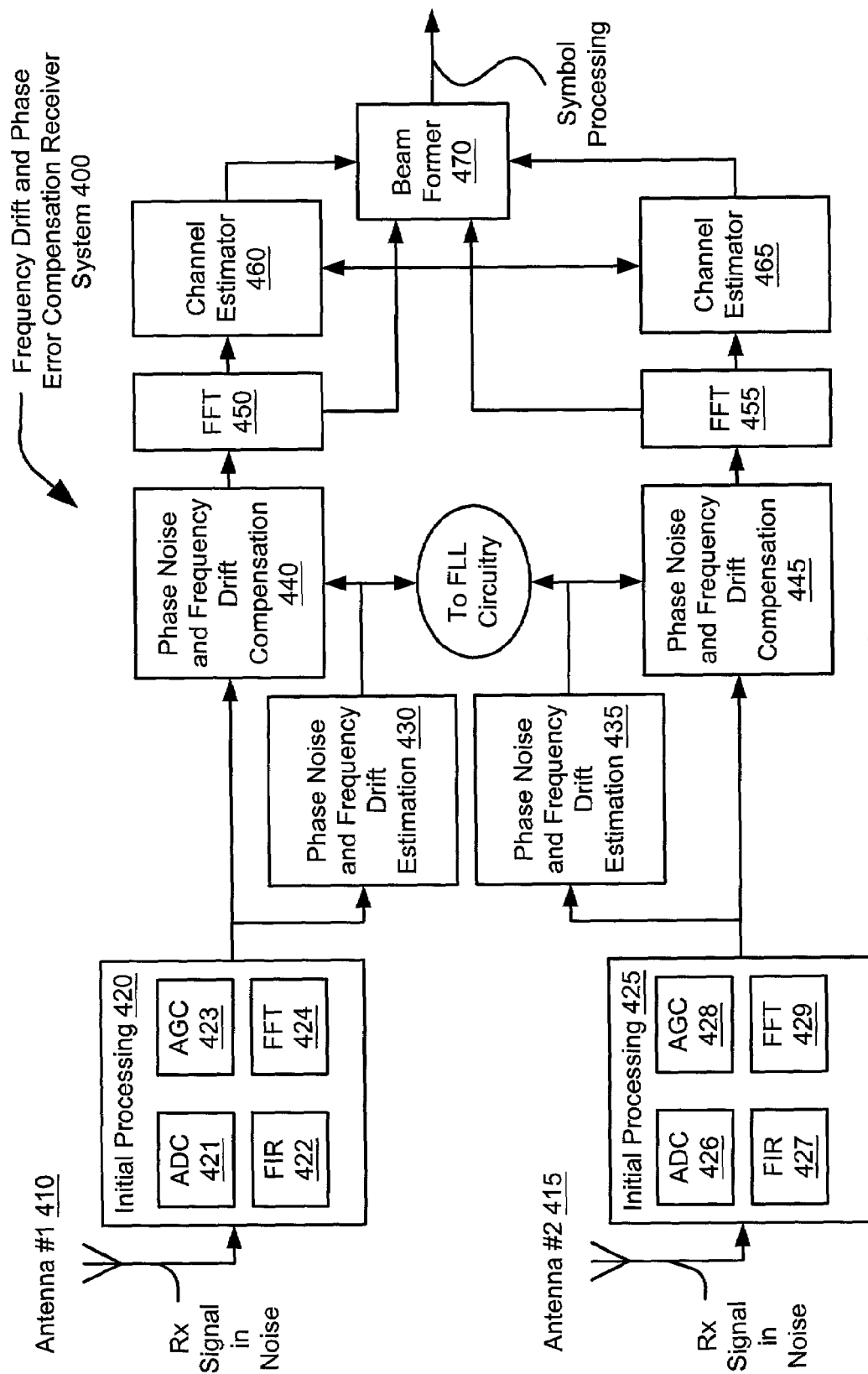
FIG. 4 is a system diagram illustrating another embodiment of a frequency drift and phase error compensation receiver system that is built according to the present invention.

FIG. 4 is a system diagram illustrating another embodiment of a frequency drift and phase error compensation receiver system 400 that is built according to the present invention. The frequency drift and phase error compensation receiver system 400 employs a dual antennae implementation, shown as an antenna #1 410 and an antenna #2 415, to perform decoding of a received signal that has been encoded using VOFDM. The operation of these dual signal paths is similar as they cooperate to perform received beamforming using a beam former 470.

Beginning with the antenna #1 410, after receiving a signal (that includes some noise), it forwards the signal onto an initial processing circuitry 420. The processing circuitry 420 performs preliminary processing of the received signal, including performing the initial analog to digital conversion (using analog to digital conversion (ADC) 421 functional block), performing a finite impulse response characterization of the communication channel (using finite impulse response (FIR) 422 functional block), performing any necessary gain control (using automatic gain control circuitry (AGC) 423 functional block), and also performing any FFT using the functional block 424. It is understood that some of these operations may be omitted in alternative embodiments, and/or additional functionality may also be included to perform the initial processing circuitry 420 of the signal received via antenna #1 410.

The signal generated by the initial processing circuitry 420 is provided simultaneously to a phase noise and frequency drift estimation 430 functional block and a phase noise and frequency drift compensation 440 functional block. As described in other embodiments of the present invention, the signal is provided to two types of functional blocks, estimation and compensation functional blocks 430 and 440. The phase noise and frequency drift estimation 430 functional block determines whether there is any phase error or frequency drift in the signal received from the antenna #1 410. If there is in fact any phase error or frequency drift, then the phase noise and frequency drift estimation 430 functional block provides this information to the phase noise and frequency drift compensation 440 functional block where the appropriate compensation is performed to substantially eliminate the effects that any phase noise and/or frequency drift may have to effectuate error when decoding the received signal. The output of the phase noise and frequency drift estimation 430 functional block is also provided to frequency locked loop (FLL) circuitry; using the FLL circuitry, the receiver system may perform frequency locking to minimize frequency drift. The output of the phase noise and frequency drift compensation 440 functional block is provided to a FFT 450 functional block, whose output is simultaneously passed to the beam former 470 and a channel estimator 460.

Within the VOFDM embodiment shown in the FIG. 4, there are two similar signal paths. A bottom signal path is similar to the signal path described above. For example, beginning now with the antenna #2 415, after receiving a signal (that includes some noise), it forwards the signal onto an initial processing circuitry 425. The processing circuitry 425 performs preliminary processing of the received signal, including performing the initial analog to digital conversion (using analog to digital conversion (ADC) 426 functional block), performing a finite impulse response characterization of the communication channel (using finite impulse response (FIR) 427 functional block), performing any necessary gain control (using automatic gain control circuitry (AGC) 428 functional block), and also performing any FFT using the functional block 429. It is understood that some of these operations may be omitted in alternative embodiments, and/or additional functionality may also be included to perform the initial processing circuitry 425 of the signal received via antenna #2 415.

The signal generated by the initial processing circuitry 425 is provided simultaneously to a phase noise and frequency drift estimation 435 functional block and a phase noise and frequency drift compensation 445 functional block. Again, as described in other embodiments of the present invention, the signal is provided to two types of functional blocks, estimation and compensation functional blocks 435 and 445. The phase noise and frequency drift estimation 435 functional block determines whether there is any phase error or frequency drift in the signal received from the antenna #2 415. If there is in fact any phase error or frequency drift, then the phase noise and frequency drift estimation 435 functional block provides this information to the phase noise and frequency drift compensation 445 functional block where the appropriate compensation is performed to substantially eliminate the effects that any phase noise and/or frequency drift may have to effectuate error when decoding the received signal. The output of the phase noise and frequency drift estimation 435 functional block is also provided to the frequency locked loop (FLL) circuitry. The output of the phase noise and frequency drift compensation 445 functional block is provided to a FFT 455 functional block, whose output is simultaneously passed to the beam former 470 and a channel estimator 465. The channel estimators 460 and 465 also operate cooperatively to provide information to the beam former 470. The beam former 470 provides a single output signal for symbol processing.

While the particular embodiment of the FIG. 4 shows a dual antenna arrangement, those persons having skill in the art will appreciate that a multi-antenna array may also be employed having more than two antennae. For example, as the number of antennae increases, then there are similar signal paths that are all combined into a single signal that is provided for symbol processing. These multi-antenna embodiments are envisioned within the scope and spirit of the invention, where the size of the antenna array is scalable to accommodate greater number of antennae.

It is noted that FIG. 4 illustrates performing phase noise compensation prior to channel estimation and beam forming.

Figure 5:
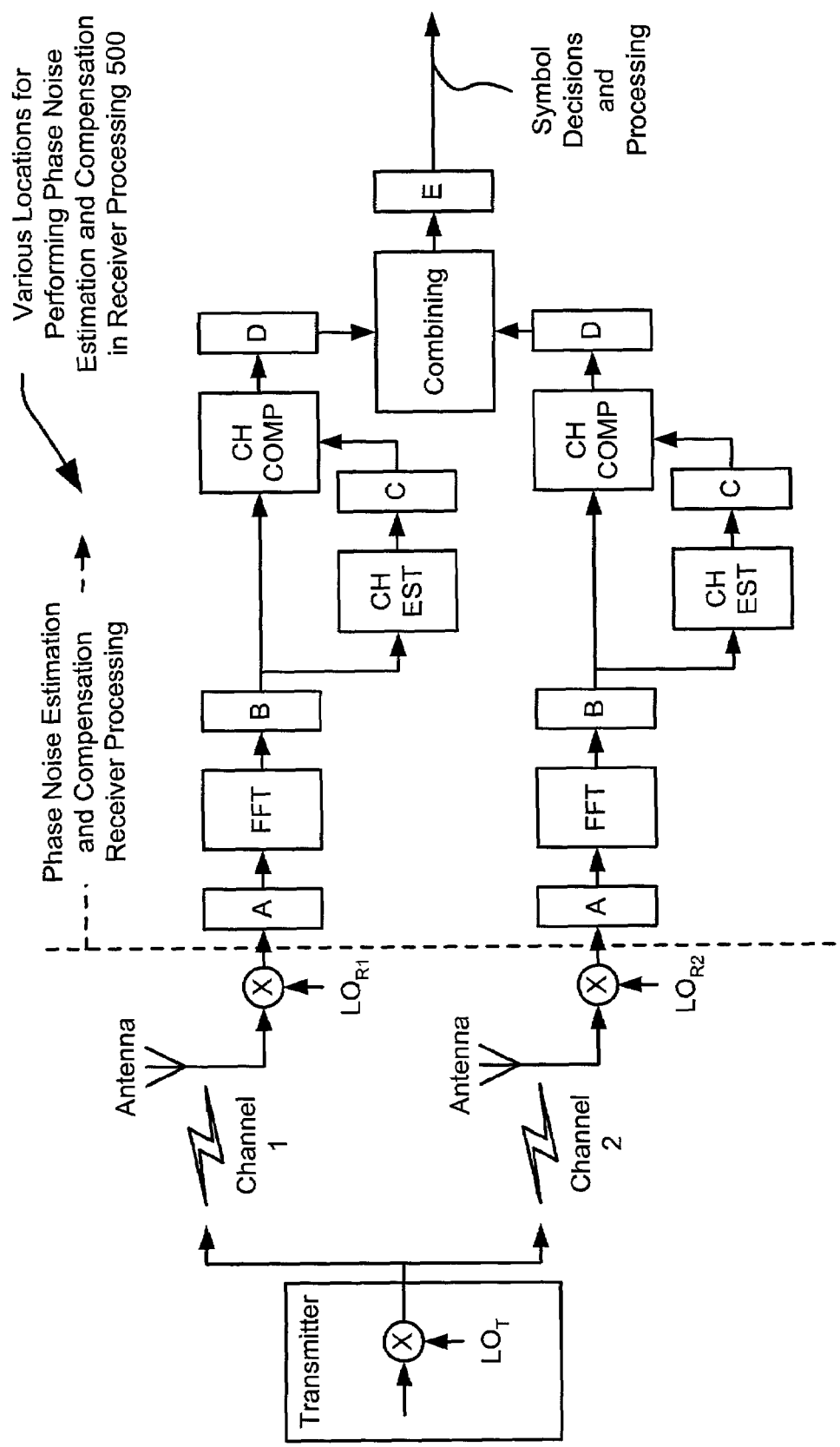
FIG. 5 is a diagram illustrating a number of various locations for performing phase noise estimation and compensation in receiver processing according to the present invention.

FIG. 5 is a diagram illustrating a number of various locations for performing phase noise estimation and compensation in receiver processing 500 according to the present invention. The FIG. 5 illustrates a set of embodiment options, including receive antennae. In this receiver processing, the estimation and compensation functions may occur at different locations in the receiver processing chain. In general, one or more frames is stored, or buffered, and processed as part of the frequency drift (or higher orders of phase drift such as quadratic, etc.) estimation, and then the buffered frame(s) is processed with compensation imposed. Then, the buffered frame(s) is further processed with additional appropriate compensation imposed.

The choice of locations in the receiver processing depends on many factors including, among other considerations, whether the dominant phase noise is introduced at the transmitter, at the receiver, whether it is dependent or independent at multiple receive antennae, whether the communication channel has significant energy in delayed multipath, and the balance between signal to thermal noise (and/or interference), and phase noise. Further, even if the optimal locations for the compensation and estimation are known for a set of conditions, sub-optimal locations may nevertheless be the best choice for performing the compensation, when the overall complexity of the compensation is considered. The present invention is able to provide for many benefits and advantages even in sub-optimal implementations.

Figure 6:
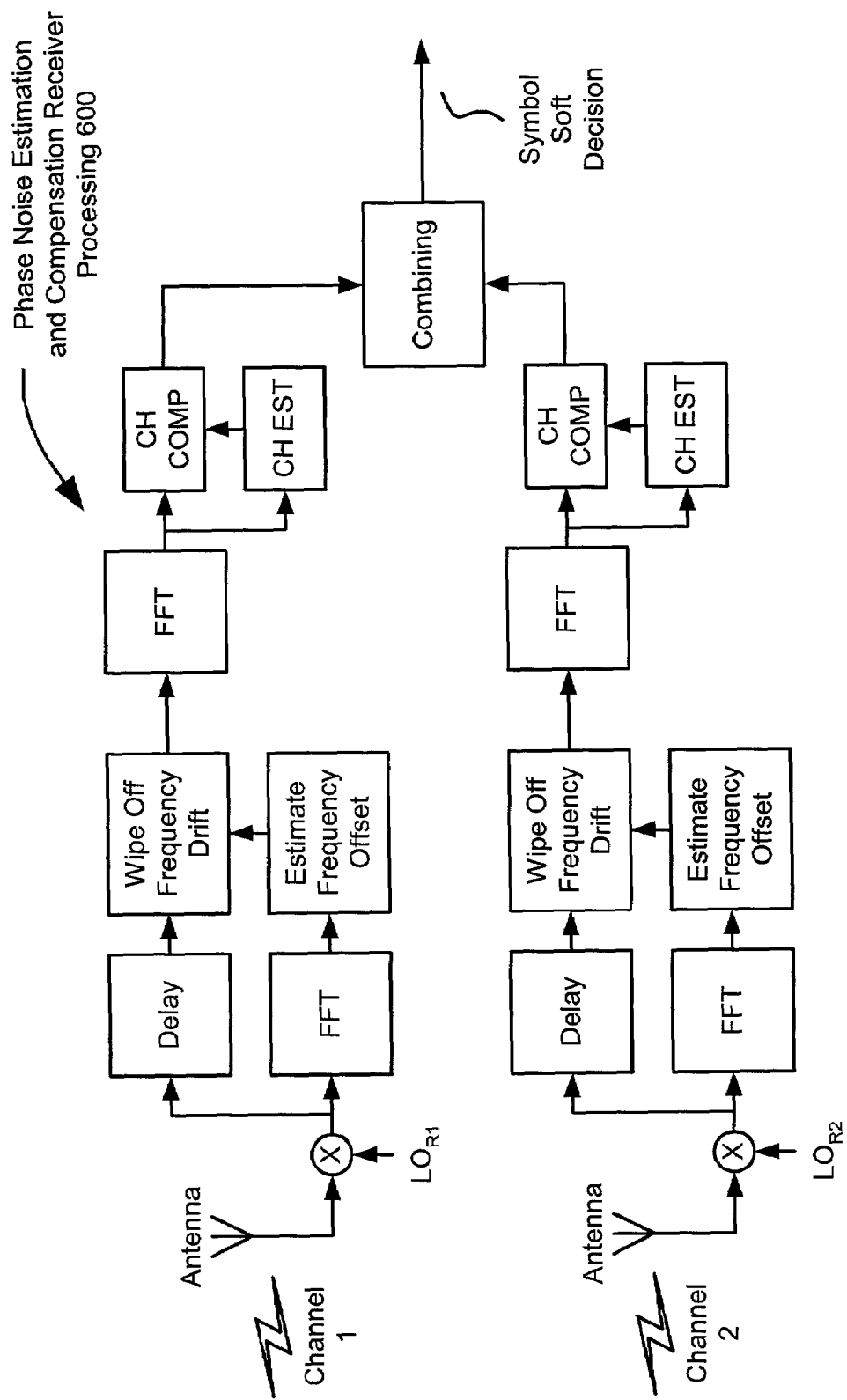
FIG. 6 is a diagram illustrating an embodiment of phase noise estimation and compensation in receiver processing according to the present invention.
Figure 7:
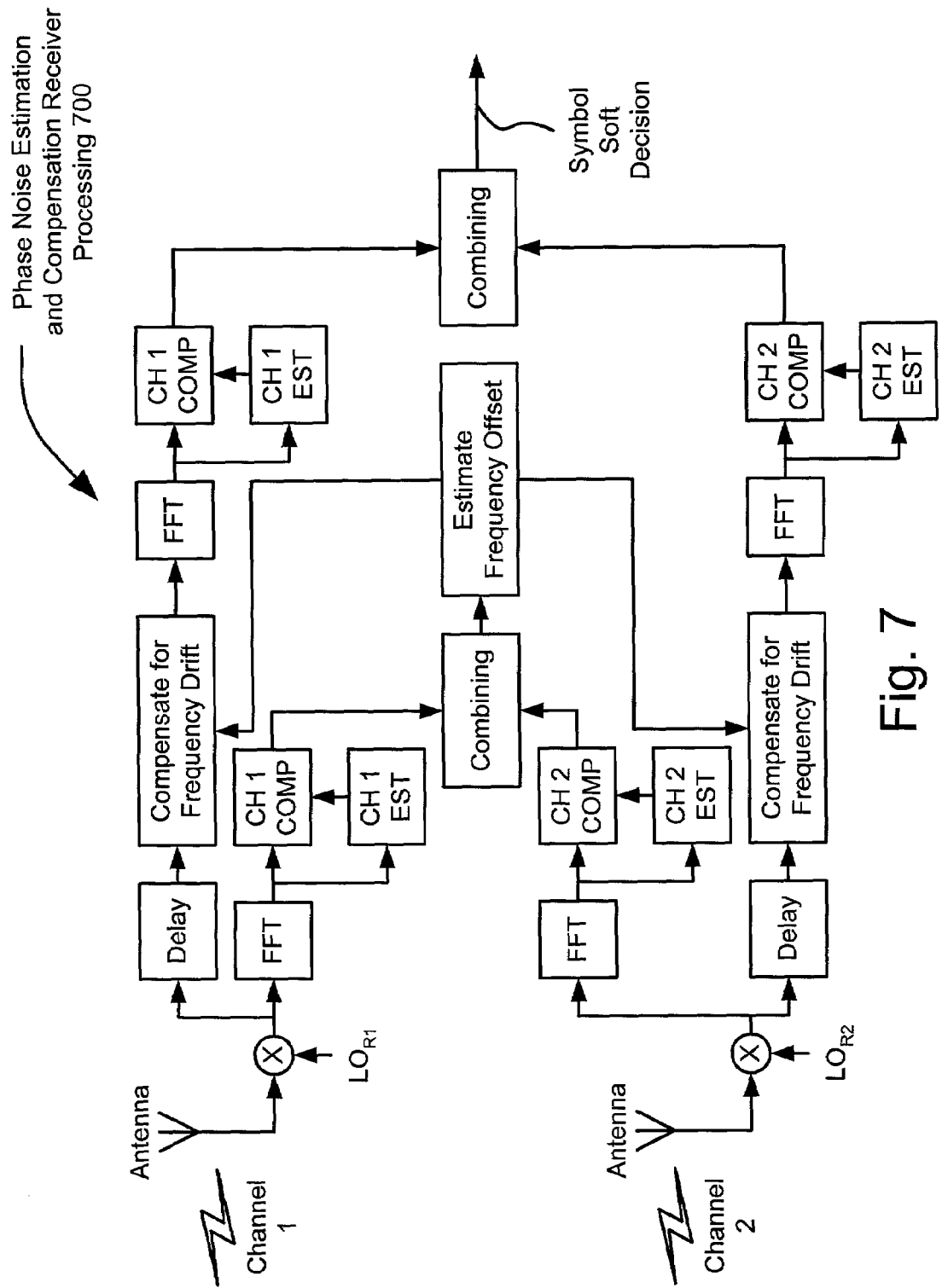
FIG. 7 is a diagram illustrating another embodiment of phase noise estimation and compensation in receiver processing according to the present invention.
Figure 8:
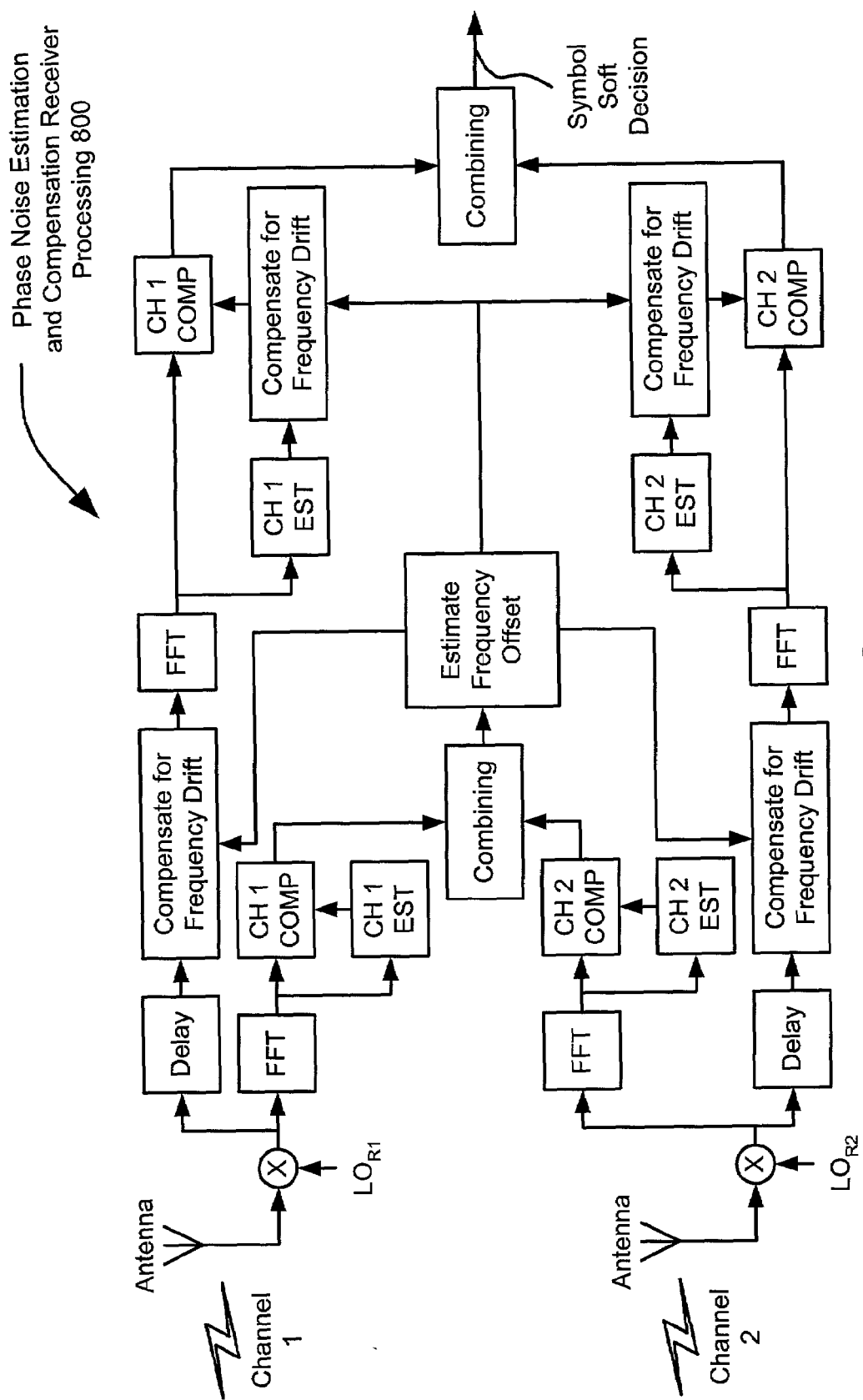
FIG. 8 is a diagram illustrating another embodiment of phase noise estimation and compensation in receiver processing according to the present invention.

FIGS. 6, 7, and 8 shows some various example embodiments of how phase noise estimation and compensation in receiver processing may be performed at the various locations of A, B, C, D, and E from the perspective of those locations within the FIG. 5.

For an example embodiment, if local oscillators $LO_{R1}$ and $LO_{R2}$ at the receiver introduce dominant phase noise, independent of each other, then estimating and compensating for this phase noise may be preferred at locations B and A within the FIG. 5, respectively. This embodiment may be viewed as being the embodiment of buffering one frame that is described below within a FIG. 6.

FIG. 6 is a diagram illustrating an embodiment of phase noise estimation and compensation in receiver processing 600 according to the present invention. As a note, the phase noise of the various receiver down-converters could be independent if separately synthesized LOs are used at each antenna.

FIG. 7 is a diagram illustrating another embodiment of phase noise estimation and compensation in receiver processing 700 according to the present invention. This shows another example embodiment that may be applied if the dominant phase noise is introduced at the receiver, but it is highly correlated between the various receiver down-converters. This could be the case if the LO for down-conversion is generated only once and distributed for use at each antenna, as an example.

In this example, the receiver processing is executed all the way through to combining the multiple antenna signals into soft decisions, and these are used to estimate frequency offset, and phase bias. These estimates are then used in compensation applied to the delayed signals prior to the FFT processing. Since the phase noise of the two sources is correlated in this instance, the quality of the estimation is improved by performing the estimation after performing the combining.

In some applications of the approaches of the FIGS. 6 and 7, the estimation approach would be frequency domain based while the compensation would be time domain based. On the other hand, frequency domain compensation could be applied after the FFT at location B (borrowing from the perspective of the FIG. 5), thus eliminating the need to FFT the received signals from each antenna a second time.

FIG. 8 is a diagram illustrating another embodiment of phase noise estimation and compensation in receiver processing 800 according to the present invention. This shows yet a third example embodiment when dominant phase noise is introduced at the transmitter. As in the FIG. 7, the entire chain of processing through to combining the multiple antenna outputs is shown, and then the phase noise estimation is performed. Again, as in the FIG. 7, phase noise compensation is then executed on the delayed signal prior to the FFT. Frequency domain based compensation could also be applied after the FFT, corresponding to the point B in the FIG. 5.

In addition, further phase noise compensation is shown in the FIG. 8 prior to the channel compensation. In one embodiment of this further compensation during the channel estimation process, the time domain version of the channel impulse response is developed, and the individual coefficients of the impulse response, corresponding to the various delays in the channel response, are each adjusted with a phase rotation corresponding (in a compensating manner) to the estimated phase noise.

In a most simple example, the transmitter has a frequency drift of $\omega_d$ radians/sec, and assume a channel impulse response of $1+\alpha_d e^{-js\tau_d}$ where there is a primary path and a secondary path with complex coefficient $\alpha_d$ and delay $\tau_d$ compared to the primary path. Therefore, when a signal s(t) is transmitted, then the combination of the frequency drift and the channel impulse response in receiving r(t) as shown below:

$$r(t)=s(t)e^{j\omega_d t}+\alpha_d s(t-\tau_d)e^{j\omega_d(t-\tau_d)}$$

Using $e^{-js\tau_d}$ as the compensation in the time domain prior to the FFT eliminates much of the deleterious effects of the phase noise in this case. However, the frequency drift causes the delayed channel response to have a coefficient of $e^{-j\omega_d \tau_d}$, rather than just the complex coefficient $\alpha_d$. In particular, if the dynamics of the frequency drift are much more rapid than the channel impulse response coefficients, then separating off the frequency drift impact, $e^{-j\omega_d \tau_d}$ away from the channel response averaging (if any), by multiplying the new channel estimate coefficients by $e^{+j\omega_d \tau_d}$, prior to averaging over the old channel response, will improve the channel response estimate, which may be viewed as $\hat{\alpha}_d$ in this case. Then, by multiplying the channel response coefficients by the frequency drift impact, $e^{-j\omega_d \tau_d}$, before the channel compensation is applied to the current frame, will complete the compensation for the frequency drift.

Figure 9:
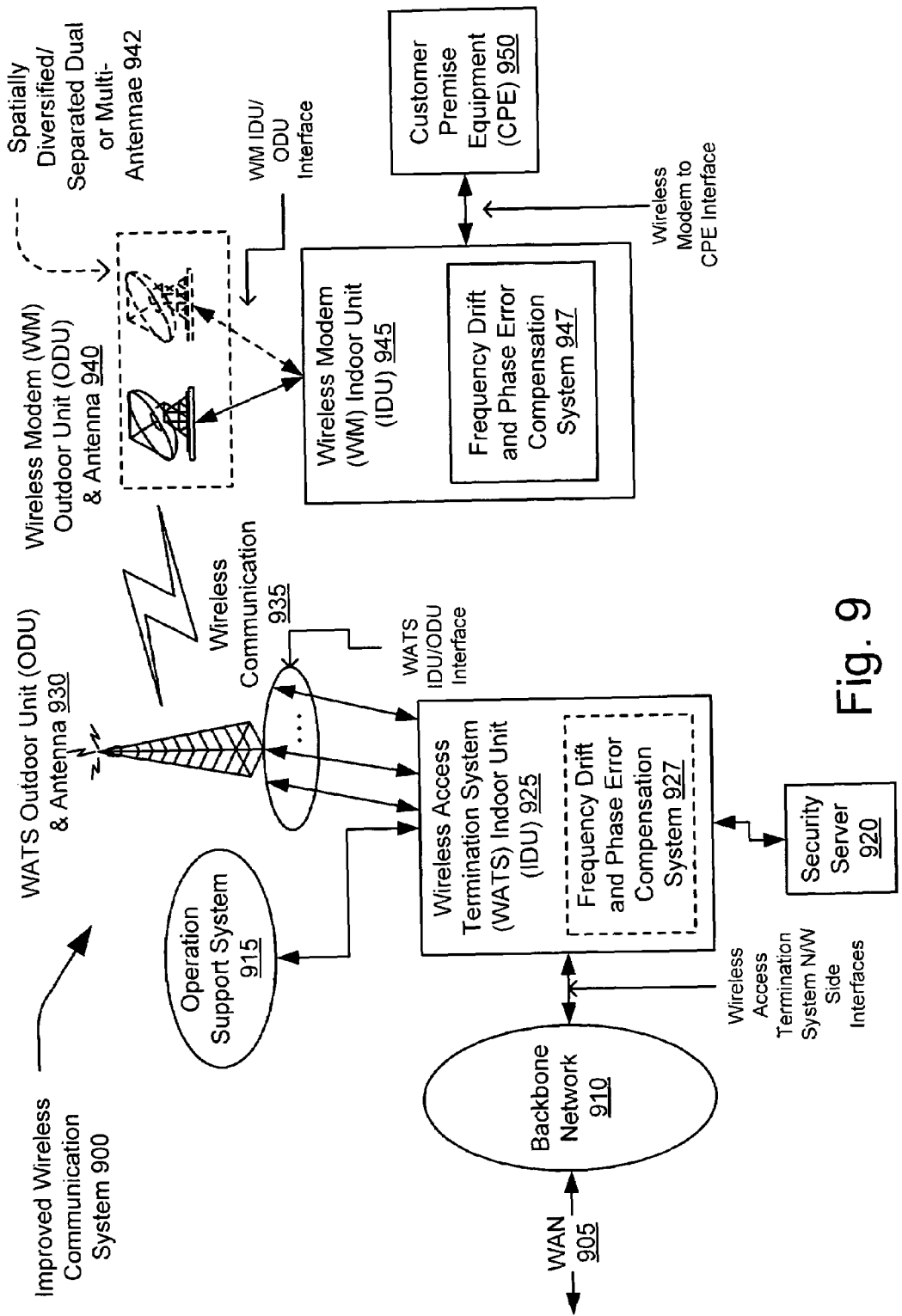
FIG. 9 is a system diagram illustrating an embodiment of an improved wireless communication system that is built according to the present invention.

FIG. 9 is a system diagram illustrating an embodiment of an improved wireless communication system 900 that is built according to the present invention. The present invention is operable within the improved wireless communication system 900 that employs the VOFDM portion of the BWIF standard set. The VOFDM standard defines the physical layer and additional layers in which a plurality, e.g., up to 1,024 separate carriers (tones) carry either data (data tones) or training/pilot signals (training/pilot tones). The 1,024 tones are separated in frequency such that they are orthogonal to one another. The VOFDM standard also defines a multiple antennae receive path that combines the signal received via each of the antennae using a combining methodology. In the receiver of a VOFDM device (sometimes referred to as a wireless modem (WM) indoor unit (IDU)), a decision block maps incoming voltage signals corresponding to a particular symbol to a modulation constellation in order to extract bits carried by the symbol.

Here, the present invention is operable to provide for improved decoding of the received voltage signal that is provided to a wireless modem (WM) indoor unit (IDU) 945; frequency drift and phase error compensation (as shown in functional block 947) within the WM IDU 945 is performed, as necessary, on signals received by the WM IDU 945. In addition, the present invention is operable to provide for improved decoding of the received voltage signal that is provided to a wireless access termination system (WATS) indoor unit (IDU) 925; frequency drift and phase error compensation (as shown in functional block 927) within the WATS IDU 925 is performed, as necessary, on signals received by the WATS IDU 925. There are certain embodiments where the compensation provided by only one of the functional blocks 947 and 927 is implemented. However, the present invention also envisions embodiments where the frequency drift and phase error compensation performed by the functional blocks 947 and 927 may both be performed within the improved wireless communication system 900. The functionality offered by the present invention may be performed in both transmit/receive paths without departing from the scope and spirit of the invention.

The improved wireless communication system 900 may be viewed in light of the wireless communication system reference architecture of the BWIF; the present invention provides for improved signal processing within the WM IDU 945. A wide area network 905 communicatively couples to a backbone network 910. The backbone network 910 in turn communicatively couples to the WATS IDU 925. The WATS IDU 925 is serviced via operation system support 915 and a security server 920. The WATS IDU 925 is operable to communicate with a WATS outdoor unit (ODU) and antenna 930 using one or more signals.

The present invention implements VOFDM where the signal is partitioned among a number of frequencies. The WATS ODU 930 communicates with a wireless modem (WM) outdoor unit (ODU) and antenna 940 via wireless communication 935. If desired, the WM ODU and antenna 940 is implemented in a spatially diversified/separated dual or multi-antennae implementation 942. The WM ODU and antenna 940 provides the one or more signals to the WM IDU 945 that is operable to perform frequency drift and phase error compensation (using the frequency drift and phase error compensation system 947) to assist in decoding of received signals. The WM IDU 945 communicatively couples to a customer premises equipment (CPE) 950. The FIG. 9 shows just one embodiment where a communication system may benefit from the functionality offered by the present invention in performing frequency drift and phase error compensation.

It is noted that the functionality offered by the present invention may be performed in both transmit/receive paths without departing from the scope and spirit of the invention, as shown by the functionality within the functional blocks 947 and 927.

Figure 10:
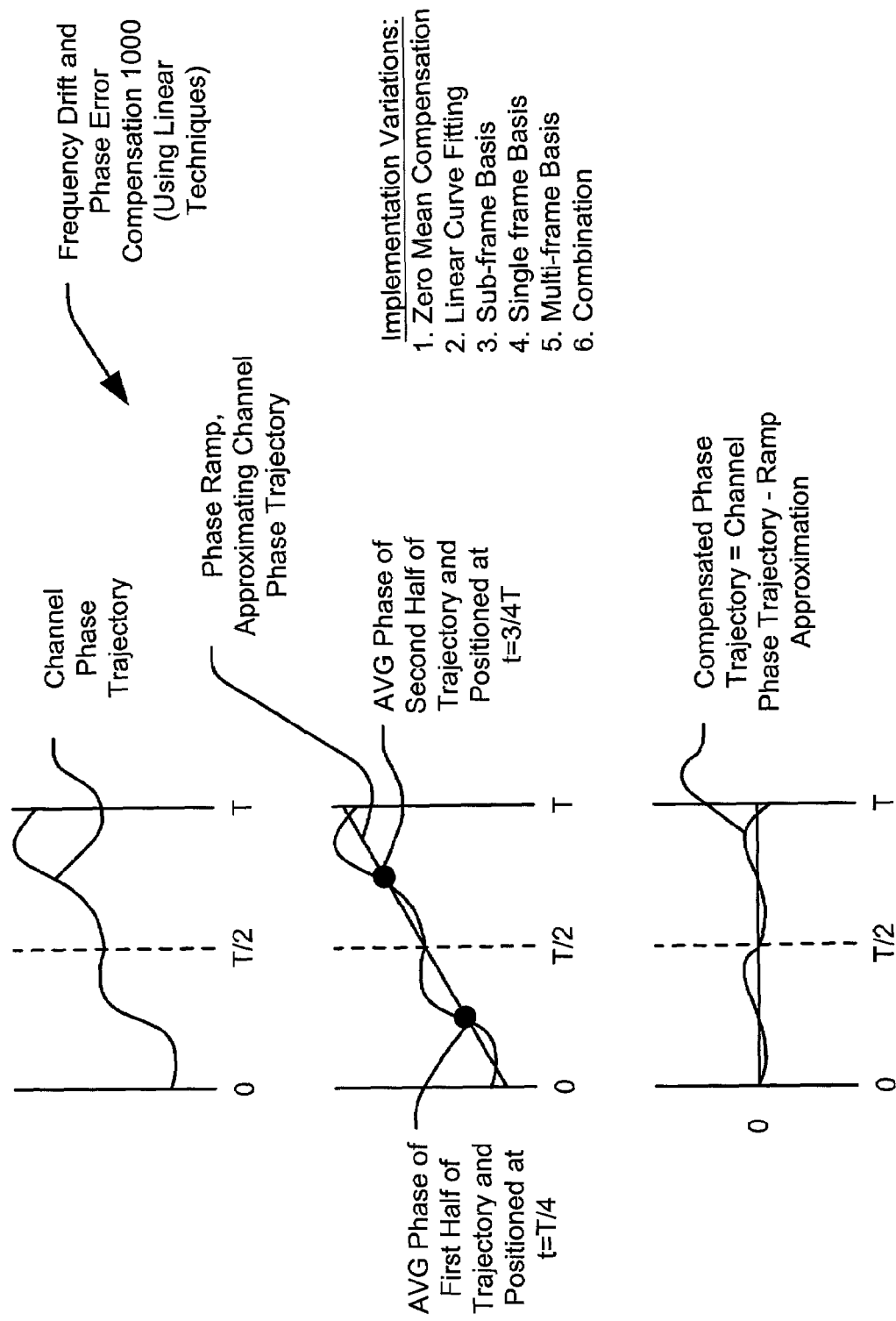
FIG. 10 is a system diagram illustrating an embodiment of frequency drift and phase error compensation, using linear techniques, that is performed according to the present invention.

FIG. 10 is a system diagram illustrating an embodiment of frequency drift and phase error compensation 1000, using linear techniques, that is performed according to the present invention. There are several variations in which linear techniques may be employed to perform compensation for the frequency drift and phase error compensation 1000. For example, the compensation may be performed on a sub-frame basis, a single frame basis, and/or a multi-frame basis. Within the sub-frame basis, the frame may be divided into any number of sub-frames. The FIG. 10 shows an embodiment where a frame is divided equally into two sub-frames. The averages of the channel phase of each of the two sub-frames are calculated, and using zero mean compensation, a ramp is calculated to track the phase and/or frequency through the full-frame portion as closely as possible. To facilitate the estimation of the carrier phase noise in a sub-frame, tones adjacent to some or all pilot tones may carry no energy in the transmission. While this approach reduces the amount of data transmitted at first glance, it allows the transmitted power to increase on the remaining tones, and it may also offer significant fidelity enhancement to the phase and frequency drift estimation and compensation. This improved compensation could result in an overall increase in the data transfer rate.

The ramping may be positive, negative, or in some rare situations, flat. The top of FIG. 10 shows a general positive sloping of the channel phase trajectory. If desired, the center points of the two averages may be used as the points to connect the linear approximation while still maintaining the zero mean compensation throughout the two sub-frames, or within the entirety of the frame. Clearly, the frame may also be sub-divided as having more than two sub-frames without departing from the scope and spirit of the invention.

If multiple sub-frames are used, the average frame of each sub-frame may be estimated, and regression techniques applied to find the best-fit line or higher order curve, fitting these averages across the frame.

The middle of FIG. 10 shows a phase ramp that is used to approximate the channel phase trajectory. The average of each of the two sub-frames is calculated, and a ramp is also calculated to match the actual phase of the frame as closely as possible; zero mean compensation is employed in this embodiment as well. Again, the compensation may be effectuated using ramping that may be positive, negative, or in some rare situations, flat. If desired, the frame is repartitioned as ranging from $-T/2$ to $+T/2$ where the center of the frame includes the average phase of the frame. The bottom of the FIG. 10 shows the compensated phase trajectory that is the difference between the channel phase trajectory and the ramp approximation.

The window that is used to perform the compensation may be analytically determined beforehand, determined during a learning process of the system, or user selected, among other ways to select the window (or number) of frames to be used. Multiple frames may also be used without departing from the scope and spirit of the invention. For example, other numbers of frames may be selected as the window over which to perform compensation. If desired, other embodiments may include whole frames and sub-frames as well. For example, a window over which compensation may be performed may include non-integer multiples of frames. Moreover, the compensation within different signal paths, in a multi-antennae embodiment, may undergo different types of compensation. The channel paths through which the received signal are communicated may incur different amounts and types of phase error and frequency drift. The present invention also envisions performing compensation differently along the different signal paths that extend from the various antennae within a multi-antennae embodiment.

Figure 11:
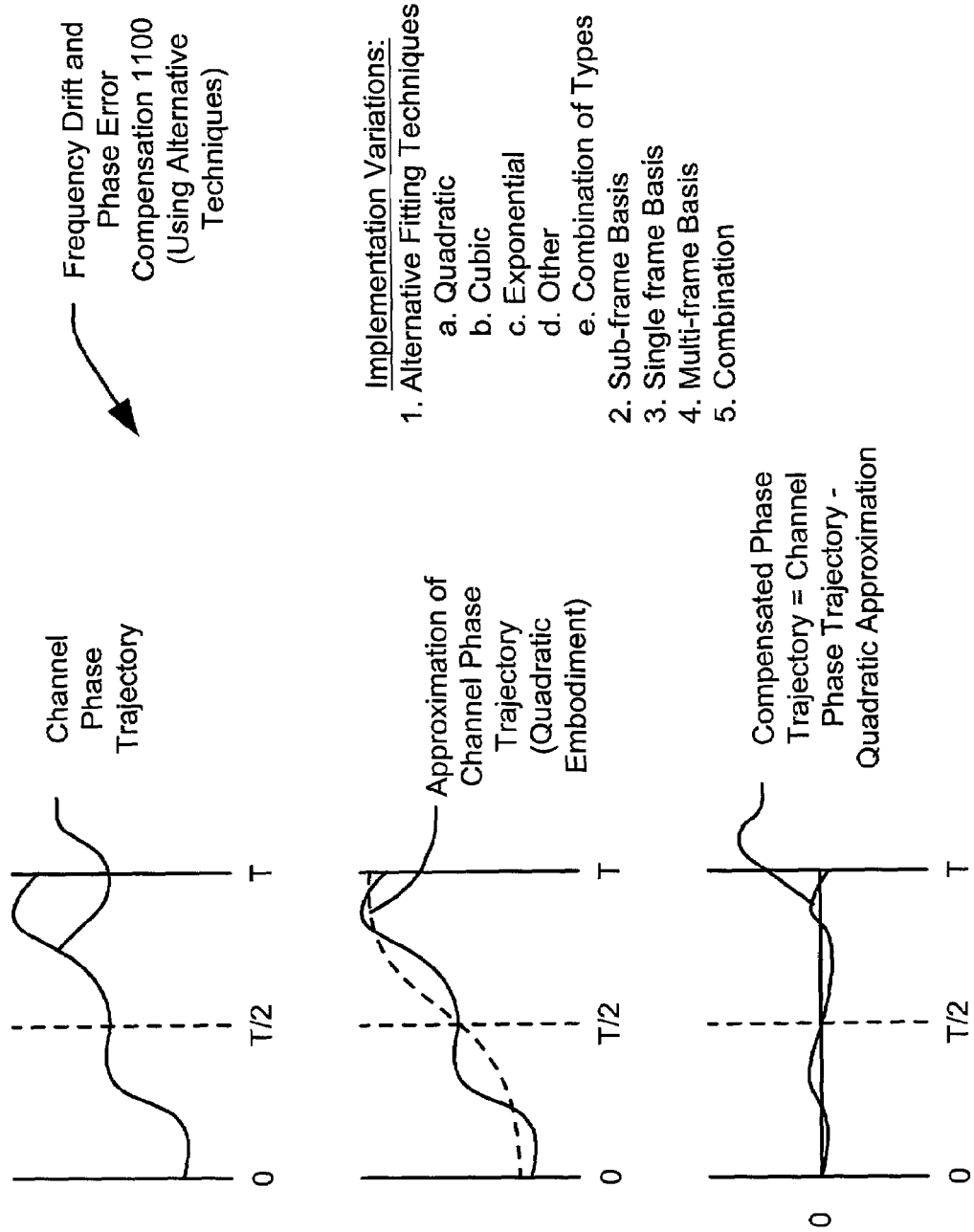
FIG. 11 is a system diagram illustrating an embodiment of frequency drift and phase error compensation, using alternative techniques, that is performed according to the present invention.

FIG. 11 is a system diagram illustrating an embodiment of frequency drift and phase error compensation 1100, using alternative techniques, that is performed according to the present invention. There are several variations in which alternative techniques may be employed to perform compensation for the frequency drift and phase error compensation 1100. For example, the compensation may be performed on a sub-frame basis, a single frame basis, and/or a multi-frame basis. Within the sub-frame basis, the frame may be divided into any number of sub-frames.

Any number of alternative fitting techniques may be employed in addition to the linear techniques. The particular embodiment of the FIG. 11 employs a quadratic approximation of the channel phase trajectory. For example, other higher order fitting techniques may also be employed, including the quadratic technique shown in the FIG. 11, cubic techniques, exponential techniques, and/or other techniques. If desired, more than one type of fitting technique may be employed within the window over which compensation is to be performed. In one embodiment, the actual phase is monitored and matched up against a predetermined number of available curves. Criteria are used to select the best match from the set, such as achieving minimum distance fit to the pilot tones, or across the entire set of data and pilot tones, using nearest constellation point for the data tones, or perhaps a weighted minimum distance, where fitting the pilot tones is given more weighting than fitting the data tones.

The top of FIG. 11 again shows a general positive sloping of the channel phase trajectory. In this particular embodiment, a quadratic approximation of the channel phase trajectory is employed to provide a matching, as closely as possible, to the actual channel phase trajectory. Similar to the embodiment of the FIG. 10, the frame within the embodiment of the FIG. 11 may also be sub-divided as having more than two sub-frames without departing from the scope and spirit of the invention.

The middle of FIG. 11 shows the quadratic approximation of the actual channel phase trajectory. Zero mean compensation is also employed in this embodiment as well. The bottom of the FIG. 11 shows the compensated phase trajectory that is the difference between the channel phase trajectory and the ramp approximation.

Again, the window that is used to perform the compensation may be analytically determined beforehand, determined during a learning process of the system, or user selected, among other ways to select the window (or number) of frames to be used. Multiple frames may also be used without departing from the scope and spirit of the invention. For example, other numbers of frames may be selected as the window over which to perform compensation. If desired, other embodiments may include whole frames and sub-frames as well. For example, a window over which compensation may be performed may include non-integer multiples of frames. Moreover, the compensation within different signal paths, in a multi-antennae embodiment, may undergo different types of compensation. The channel paths through which the received signal are communicated may incur different amounts and types of phase error and frequency drift. The present invention also envisions performing compensation differently along the different signal paths that extend from the various antennae within a multi-antennae embodiment.

The FIG. 11 shows how curve matching may be performed using non-linear techniques as well; in the particular embodiment of the FIG. 10, a quadratic approximation is performed. The FIG. 10 shows one embodiment that is extremely efficient in terms of implementation and performance, particularly when the phase error and/or frequency drift over a frame is substantially linear in nature. However, the scope and spirit of the present invention may be applied to embodiments where non-linear compensation is performed as well. Similar to the embodiment of the FIG. 10, the embodiment of FIG. 1 may also be implemented to provide for different compensation within different signal paths in a multi-antennae embodiment. The channel paths through which the received signal are communicated may incur different amounts and types of phase error and frequency drift. The present invention also envisions performing compensation differently along the different signal paths that extend from the various antennae within a multi-antennae embodiment.

FIG. 12 is a functional block diagram illustrating an embodiment of a frequency drift and phase error compensation method 1200 that is performed according to the present invention. In a block 1210, a raw signal is characterized. This raw signal may be viewed as being a signal received by a receiver that is capable of performing frequency drift and phase error compensation on a signal received after it has passed through a communication channel. After performing the characterization of the raw signal in the block 1210, then it is determined in a block 1220 whether any compensation should be performed on the raw signal. If it is determined that no compensation needs to be performed in the block 1220, then the frequency drift and phase error compensation method 1200 terminates, as shown by the dotted line.

However, when it is determined that compensation does in fact need to be performed in the block 1220, then the particular type of compensation that should be performed is identified in a block 1230. In a block 1240, the actual performance/implementation that is identified above in the block 1230. It is noted that the compensation may be performed using any of the variations of the present invention described herein. The compensation may be performed on a sub-frame basis, a single frame basis, and/or a multi-frame basis. This compensation may be implemented via linear curve fitting and/or alternative curve fitting including higher order curve fitting. FIG. 13 is a functional block diagram illustrating another embodiment of a frequency drift and phase error compensation method 1300 that is performed according to the present invention.

Beginning in a block 1310, a window over which to perform compensation is determined/identified. This window may include one or more sub-frames, one or more frames, and/or a combination of one or more sub-frames and one or more frames. In a block 1320, a received signal is unscrambled and the modulation of the training tones (TTs) is wiped off. Now, the remaining information in the received signal includes the zero tones and the data tones. The zero tones are ignored, and the remaining useful information then includes the data tones. It is the data tones themselves that may or may not undergo compensation to substantially eliminate the effects of phase noise and frequency drift of the received signal before undergoing signal processing including symbol processing.

After the modulation of the TTs has been wiped off in the block 1320, there are at least two possible paths in which the method may continue. In one embodiment, where the compensation is performed using linear compensation techniques, an average phase for the window is calculated in a block 1330. Again, this window may be of various sizes. In addition, the size of the window may be analytically determined offline, it may be modified adaptively during operation of the method, or it may be determined using a combination of the two options. In the linear compensation embodiment, an average phase for the window and the ramp are calculated in a block 1340. Then, after these compensation parameters (average phase and ramp) are calculated in the block 1340, the data are then re-mixed in a block 1350. When the data have undergone an analog to digital conversion before this point, then the re-mixing of the data is performed via mathematical manipulation of the digital data. Also, this re-mixing of the data, in physically performing the compensation that is necessary to substantially eliminate the effects of any undesirable phase error and frequency drift, may be performed on a sub-frame basis, a single frame basis, and/or a multi-frame basis. This compensation may be implemented via linear curve fitting and/or alternative curve fitting including higher order curve fitting.

In an alternative embodiment as shown in a block 1360, alternative compensation parameters may be calculated for use in performing the operations of the block 1350. For example, depending on the type of compensation that is identified, then the appropriate compensation parameters are calculated. For example, when a quadratic type function of curve fitting is identified as the appropriate form of compensation to be performed, then quadratic compensation parameters are calculated as shown in a block 1362; similarly, when a cubic type function of curve fitting is identified as the appropriate form of compensation to be performed, then cubic compensation parameters are calculated as shown in a block 1364; these parameters include the coefficients of the polynomial that is used to perform the curve fitting. In addition, when an exponential type function of curve fitting is identified as the appropriate form of compensation to be performed, then exponential compensation parameters are calculated as shown in a block 1366; these parameters may include the exponents and/or the coefficients of a series of exponential terms. Those persons having skill in the art will appreciate that many forms of curve fitting of the phase, within a compensation window, may be performed in a number of ways without departing from the scope and spirit of the invention. Any number of functions may be employed to do the curve fitting. Generically speaking, any other type of parameters (shown in a functional block 1369) may be employed to perform the proper compensation within the window, be it a sub-frame, a frame, or a number of frames.

It is again noted that the linear compensation methods may be performed in cooperation with the alternative compensation method including higher order curve fitting compensation methods. For example, within one window, linear compensation may be performed, yet within another window, some alternative form of curve fitting may be used. Moreover, the compensation performed in accordance with the present invention may be performed based on the actual drift of any phase within a sub-frame, a frame, or a number of frames. In one situation where very little drift is being detected during the phase and frequency estimation, then no compensation need be performed during that window of data. In addition, when the particular characterization of the drift within a window is very consistent with the previous window, then those compensation parameters may simply be used within the current window. It is again noted that the present invention is operable using a variety of window sizes: whether the compensation is performed on a sub-frame basis, a frame basis, or a multi-frame basis.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. An apparatus, comprising:
   a raw signal characterization circuitry that is operable to estimate a phase and a frequency over a window of a received signal that includes data, the raw signal characterization circuitry being operable to identify whether any phase error and frequency compensation is necessary to adjust for phase error and frequency drift in the data within the window of the received signal;
   a raw signal compensation circuitry that is operable to perform the identified, necessary phase error and frequency compensation to data within the window; and
   wherein the window of the received signal is compensated for any phase error and frequency drift, when necessary, before performing symbol processing, that includes demodulating and decoding, on the window.

2. The apparatus of claim 1, wherein the window of the received signal comprises at least one of a sub-frame, a frame, a plurality of frames, and a combination comprising a sub-frame and at least one frame.

3. The apparatus of claim 1, wherein the phase error and frequency compensation comprises linear curve matching techniques.

4. The apparatus of claim 3, wherein the linear curve matching techniques comprise an average and a ramp for the window of the received signal while maintaining zero mean compensation.

5. The apparatus of claim 1, wherein the phase error and frequency compensation comprises alternative curve matching techniques including at least one of quadratic curve matching techniques, cubic curve matching techniques, and exponential curve matching techniques.

6. The apparatus of claim 1, further comprising a plurality of antennae that is configured in a spatially diversified manner, each antenna within the plurality of antennae outputs an antenna signal; and
   the apparatus combines each of the antenna signals into a single signal to generate the received signal.

7. The apparatus of claim 1, wherein the apparatus is a communication receiver that includes a wireless modem indoor unit.

8. The apparatus of claim 1, wherein the apparatus is a communication receiver that is employed within a communication system that employs vector orthogonal frequency division multiplexing.

9. The apparatus of claim 1, wherein the apparatus is a communication receiver that is employed within a communication system that employs at least one of a QPSK coding scheme, a 16 QAM coding scheme, a 64 QAM coding scheme, a 256 QAM coding scheme, and a 1024 QAM coding scheme.

10. The apparatus of claim 1, wherein the received signal passes through the raw signal compensation circuitry unaltered when the raw signal characterization circuitry determines that no phase error and frequency compensation need be performed to the data within the window of the received signal.

11. The apparatus of claim 1, wherein the raw signal compensation circuitry performs the identified, necessary phase error and frequency compensation to data within the window using time domain based compensation.

12. The apparatus of claim 1, wherein the raw signal compensation circuitry performs the identified, necessary phase error and frequency compensation to data within the window using frequency domain based compensation.

13. The apparatus of claim 1, wherein the identified, necessary phase error and frequency compensation comprises wiping off a frequency drift of the data within the window using time domain based compensation.

14. The apparatus of claim 1, wherein the raw signal compensation circuitry multiplies a plurality of channel response coefficients by a frequency drift impact before performing the identified, necessary phase error and frequency compensation to the data within the window.

15. A communication receiver that is operable to perform phase noise and frequency drift compensation on a plurality of received signals, comprising:
   a plurality of antennae that is configured in a spatially diversified manner, each antenna receives one received signal and outputs an antenna signal;
   a plurality of phase noise and frequency drift estimation circuitries that is operable to estimate a phase and a frequency of each antenna signal provided by the plurality of antennae and to identify any phase error and frequency compensation that is necessary to adjust for phase error and frequency drift in data within a window of at least one of the antenna signals, each phase noise and frequency drift estimation circuitry is communicatively coupled to one antenna within the plurality of antennae;
   a plurality of phase noise and frequency drift compensation circuitries that is operable to perform the identified, necessary phase error and frequency compensation to data within the at least one of the windows of the antenna signals, each phase noise and frequency drift compensation circuitry is communicatively coupled to one antenna and to one phase noise and frequency drift estimation circuitry;

a plurality of fast Fourier transform circuitries that is operable to transform the output signals from the plurality of phase noise and frequency drift compensation circuitries into the frequency domain, each fast Fourier transform circuitry is communicatively coupled to one phase noise and frequency drift compensation circuitry;

a plurality of channel estimator circuitries that is operable to estimate characteristics for each of the channel paths through which the plurality of received signals are communicated, each channel estimator circuitry is communicatively coupled to one of the fast Fourier transform circuitries; and a beam former, communicatively coupled to each fast Fourier transform circuitry and to each channel estimator circuitry, that generates a single output signal for symbol processing.

16. The communication receiver of claim 15, further comprising a plurality of initial processing circuitries, each initial processing circuitry of the plurality of initial processing circuitries is communicatively coupled to one of the antennae within the plurality of antennae, the initial processing circuitry operate on the antenna signals is operable to perform signal processing on the received signals, the signal processing comprising at least one of analog to digital conversion, finite impulse response analysis, automatic gain control, and fast Fourier transform analysis.

17. The communication receiver of claim 16, wherein results from one of the signal processing circuitries is simultaneously provided to one of the phase noise and frequency drift estimation circuitries and to one of the phase noise and frequency drift compensation circuitries.

18. The communication receiver of claim 15, wherein the window of the at least one of the antenna signals comprises at least one of a sub-frame, a frame, a plurality of frames, and a combination comprising a sub-frame and at least one frame.

19. The communication receiver of claim 15, wherein the identified, necessary phase error and frequency compensation comprises linear curve matching techniques.

20. The communication receiver of claim 19, wherein the linear curve matching techniques comprise calculating an average and a ramp for the window of the at least one of the antenna signals while maintaining zero mean compensation.

21. The communication receiver of claim 15, wherein the identified, necessary phase error and frequency compensation comprises alternative curve matching techniques including at least one of quadratic curve matching techniques, cubic curve matching techniques, and exponential curve matching techniques.

22. The communication receiver of claim 15, wherein the identified, necessary phase error and frequency compensation comprises mathematical manipulating digital data that are representative of the at least one of the antenna signals.

23. The communication receiver of claim 15, wherein the communication receiver comprises a wireless modem indoor unit.

24. The communication receiver of claim 15, wherein the communication receiver is employed within a communication system that employs vector orthogonal frequency division multiplexing.

25. The communication receiver of claim 24, wherein plurality of antennae comprises two antennae.

26. The communication receiver of claim 15, wherein the communication receiver is employed within a communication system that employs at least one of a QPSK coding scheme, a 16 QAM coding scheme, a 64 QAM coding scheme, a 256 QAM coding scheme, and a 1024 QAM coding scheme.

27. The communication receiver of claim 15, wherein the at least one of the antenna signals passes through one of the plurality of phase noise and frequency drift compensation circuitries when one of the plurality of phase noise and frequency drift estimation circuitries determines that no phase error and frequency compensation need be performed to the data within the window of the at least one of the antenna signals.

28. The communication receiver of claim 15, wherein at least one of the phase noise and frequency drift compensation circuitries performs the identified, necessary phase error and frequency compensation to data within the at least one of the windows of the antenna signals using time domain based compensation.

29. The communication receiver of claim 15, wherein at least one of the phase noise and frequency drift compensation circuitries performs the identified, necessary phase error and frequency compensation to data within the at least one of the windows of the antenna signals using frequency domain based compensation.

30. The communication receiver of claim 15, wherein at least one of the phase noise and frequency drift compensation circuitries performs the identified, necessary phase error and frequency compensation to data within the at least one of the windows of the antenna signals comprises wiping off a frequency drift of the data within the window using time domain based compensation.

31. The communication receiver of claim 15, wherein at least one of the phase noise and frequency drift compensation circuitries multiplies a plurality of channel response coefficients by a frequency drift impact before performing the identified, necessary phase error and frequency compensation to the data within the at least one of the windows of the antenna signals.

32. A method, comprising:

receiving a signal;

characterizing a received signal over a window of the received signal that includes data;

determining whether any phase error and frequency compensation is necessary to adjust for phase error and frequency drift in data within a the window of the received signal; and identifying a type of compensation to correct for the phase error and frequency drift in the data within the window of the received signal when phase error and frequency compensation is determined to be necessary;

calculating a compensation parameter when phase error and frequency compensation is determined to be necessary;

performing the identified type of compensation by employing the calculated compensation parameter to manipulate the data within the window of the received signal to correct for the phase error and frequency drift in data when phase error and frequency compensation is determined to be necessary; and performing symbol processing, that includes demodulating and decoding, on the data within the window.

33. The method of claim 32, wherein the type of compensation comprises employing linear curve matching techniques.

34. The method of claim 33, wherein the compensation parameter comprises an average and a ramp for the data within the window; and further comprising maintaining zero mean compensation within the window.

35. The method of claim 32, wherein the window of the received signal comprises at least one of a sub-frame, a frame, and a plurality of frames, and a combination comprising a sub-frame and at least one frame.

36. The method of claim 32, wherein the type of compensation comprises alternative curve matching techniques including at least one of quadratic curve matching techniques, cubic curve matching techniques, and exponential curve matching techniques.

37. The method of claim 32, further comprising receiving a plurality of antenna signals using a plurality of antennae that is configured in a spatially diversified manner, each antenna within the plurality of antennae outputs an antenna signal; and
combining each of the antenna signals into a single signal to generate the received signal.

38. The method of claim 32, wherein method is performed within a wireless modem indoor unit.

39. The method of claim 32, wherein the method is performed within a communication receiver that is employed within a communication system that employs vector orthogonal frequency division multiplexing.

40. The method of claim 32, wherein the method is performed within a communication receiver that employs at least one of a QPSK coding scheme, a 16 QAM coding scheme, a 64 QAM coding scheme, a 256 QAM coding scheme, and a 1024 QAM coding scheme.

41. The method of claim 32, wherein the performing of the identified type of compensation is performed within the time domain.

42. The method of claim 32, wherein the performing of the identified type of compensation is performed within the frequency domain.

43. The method of claim 32, wherein the performing of the identified type of compensation comprises wiping off a frequency drift of the data within the window of the received signal using time domain based compensation.

44. The method of claim 32, wherein the performing of the identified type of compensation comprises multiplying a plurality of channel response coefficients by a frequency drift impact before performing the identified type of compensation.

45. A frequency drift and phase error compensation method, comprising:
receiving a plurality of signals using a plurality of antennae that is configured in a spatially diversified manner, each antenna receives one received signal and outputs an antenna signal;
estimating a phase and a frequency for each of the antenna signals;
identifying any phase error and frequency compensation that is necessary to adjust for phase error and frequency drift in data within a window of at least one of the antenna signals;
calculating a compensation parameter;
performing the identified, necessary phase error and frequency compensation to data within the at least one of the windows of the antenna signals using the calculated compensation parameter;
transforming the at least one of the antenna signals into the frequency domain;
estimating a channel characteristic for each of the channel paths through which the plurality of received signals are communicated; and
generating a single output signal for symbol processing using a beam former.

46. The method of claim 45, wherein the identified, necessary phase error and frequency compensation comprises employing linear curve matching techniques.

47. The method of claim 46, wherein the compensation parameter comprises an average and a ramp for the data within the window; and further comprising maintaining zero mean compensation within the window.

48. The method of claim 45, wherein the window of the at least one of the antenna signals comprises at least one of a sub-frame, a frame, and a plurality of frames or a combination comprising a sub-frame and at least one frame.

49. The method of claim 45, wherein the identified, necessary phase error and frequency compensation comprises alternative curve matching techniques including at least one of quadratic curve matching techniques, cubic curve matching techniques, and exponential curve matching techniques.

50. The method of claim 45, wherein method is performed within a wireless modem indoor unit.

51. The method of claim 45, wherein the method is performed within a communication receiver that is employed within a communication system that employs vector orthogonal frequency division multiplexing.

52. The method of claim 45, wherein the method is performed within a communication receiver that employs at least one of a QPSK coding scheme, a 16 QAM coding scheme, a 64 QAM coding scheme, a 256 QAM coding scheme, and a 1024 QAM coding scheme.

53. The method of claim 45, wherein the performing of the identified, necessary phase error and frequency compensation to the data within the at least one of the windows of the antenna signals is performed within the time domain.

54. The method of claim 45, wherein the performing of the identified, necessary phase error and frequency compensation to the data within the at least one of the windows of the antenna signals is performed within the frequency domain.

55. The method of claim 45, wherein the performing of the identified, necessary phase error and frequency compensation comprises wiping off a frequency drift of the data within the at least one of the windows of the antenna signals using time domain based compensation.

56. The method of claim 45, wherein the performing of the identified, necessary phase error and frequency compensation comprises multiplying a plurality of channel response coefficients by a frequency drift impact before performing the identified, necessary phase error and frequency compensation.

* * * * *